Oct. 25, 1966

C. E. HUGHES ETAL 3,280,723

APPARATUS FOR PREPARING POTATO CHIPS

Filed March 3, 1964

INVENTORS
Clyde E. Hughes
Alton S. Worsley
by Belter Cushman & Croan
ATT'YS

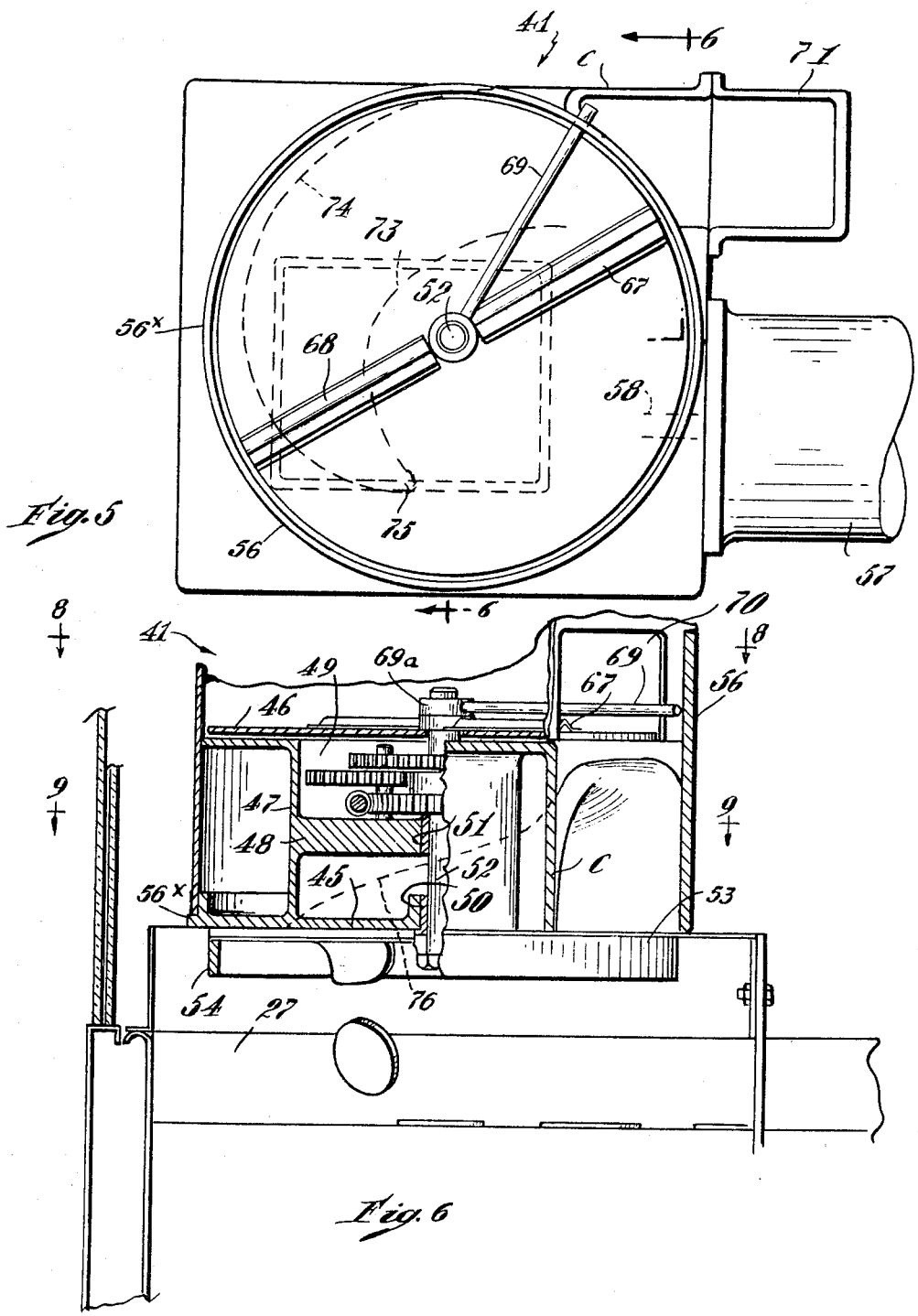

Oct. 25, 1966    C. E. HUGHES ETAL    3,280,723
APPARATUS FOR PREPARING POTATO CHIPS
Filed March 3, 1964    7 Sheets-Sheet 5

Oct. 25, 1966 C. E. HUGHES ETAL 3,280,723
APPARATUS FOR PREPARING POTATO CHIPS
Filed March 3, 1964 7 Sheets-Sheet 6

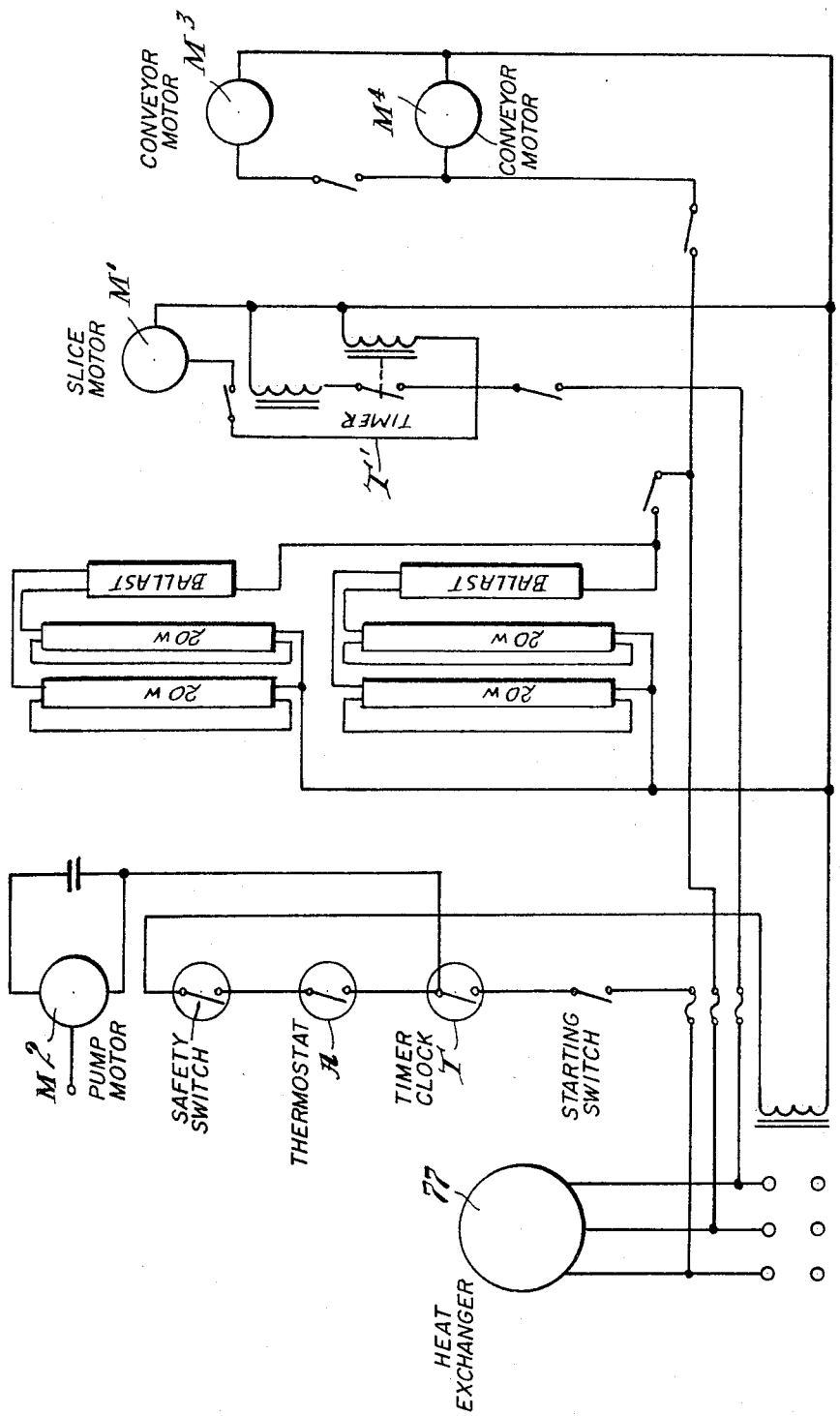

United States Patent Office 3,280,723
Patented Oct. 25, 1966

3,280,723
APPARATUS FOR PREPARING POTATO CHIPS
Clyde E. Hughes and Alton S. Worsley, New Bedford, Mass., assignors to Schmidt Mfg. Co., New Bedford, Mass., a corporation of Massachusetts
Filed Mar. 3, 1964, Ser. No. 349,035
8 Claims. (Cl. 99—353)

This invention pertains to apparatus for preparing and dispensing potato chips and which is so designed that in response to the actuation of a push-button or other manually-actuatable switch the apparatus will prepare and deliver a measured quantity of hot, cooked-to-order potato chips within a predetermined period of time. The apparatus is designed primarily for the retail sale of potato chips to a customer who, after ordering potato chips, expects to receive them in the shortest possible time. With this in view the apparatus is so devised that the slices as they are removed from the raw potato will fall, one-by-one, into hot cooking fat or grease so that there is no tendency for them to stick together and thus each individual slice is fully exposed to the hot fat and quickly and uniformly cooked as it is moved along toward the point of delivery. To be acceptable for such intended use, the apparatus should be as nearly automatic as possible; of small dimensions so that it may be installed where available space is limited; requiring no more than one attendant to supervise its operation as, for example, to keep the supply magazine filled with raw peeled potatoes and the level of the hot fat in the cooking receptacle at the desired height; to actuate the switch to start the machine; to place the cooked chips in a suitable dispensing receptacle; and to receive the purchaser's money; it should be so designed as to minimize the possibility of jamming of the potatoes as fed from a hopper; to make chips of substantially uniform thickness and without waste of potatoes; and wherein those parts which come in contact with the potatoes are such that they may readily be cleansed.

The present invention has for its principal objects the provision of apparatus having the above desirable characteristics, that is to say, to provide apparatus of such material and character that it is non-injurious to the potatoes; that the potatoes will move from the supply magazine, without jamming or bridging, into the field of action of the slicing instrumentality; to provide an arrangement which insures substantially uniformly thick slices and without tearing or breaking the potato, but with provision whereby the thickness of the slice may be adjusted in accordance with the character of the potato available; to provide apparatus which may be cleaned readily and thus kept in sanitary condition; and to provide apparatus so devised that the cooking of the potato chips is rapid and may be readily observed by the customer.

Other and further objects and advantages of the invention will be pointed out in the following more detailed description and by reference to the accompanying drawings wherein:

FIG. 5 is a fragmentary plan view, to larger scale than FIG. 2, looking down into the supply reservoir or hopper and showing the upper end of the chute down which the potatoes move in approaching the field of action of the slicing instruments, a portion of the casing of the drive motor being also shown in plan view;

FIG. 6 is a fragmentary vertical section substantially on the line 6—6 of FIG. 5;

FIG. 18 is a circuit diagram illustrating the electrical controls for the apparatus.

Figure 2:
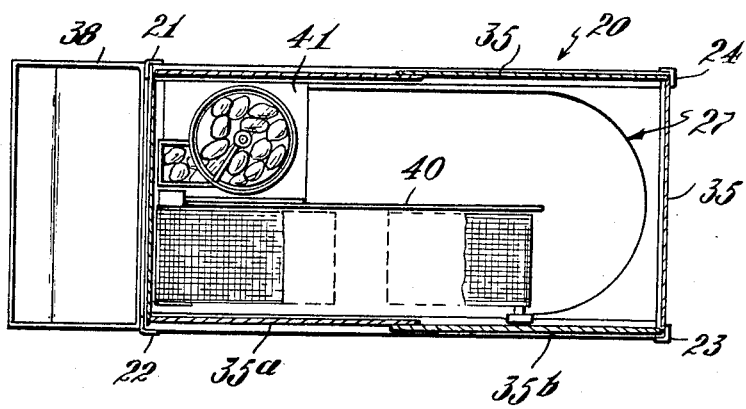
FIG. 2 is a somewhat diagrammatic horizontal section, to smaller scale, substantially in the plane indicated by the line 2—2 of FIG. 1.
Figure 3:
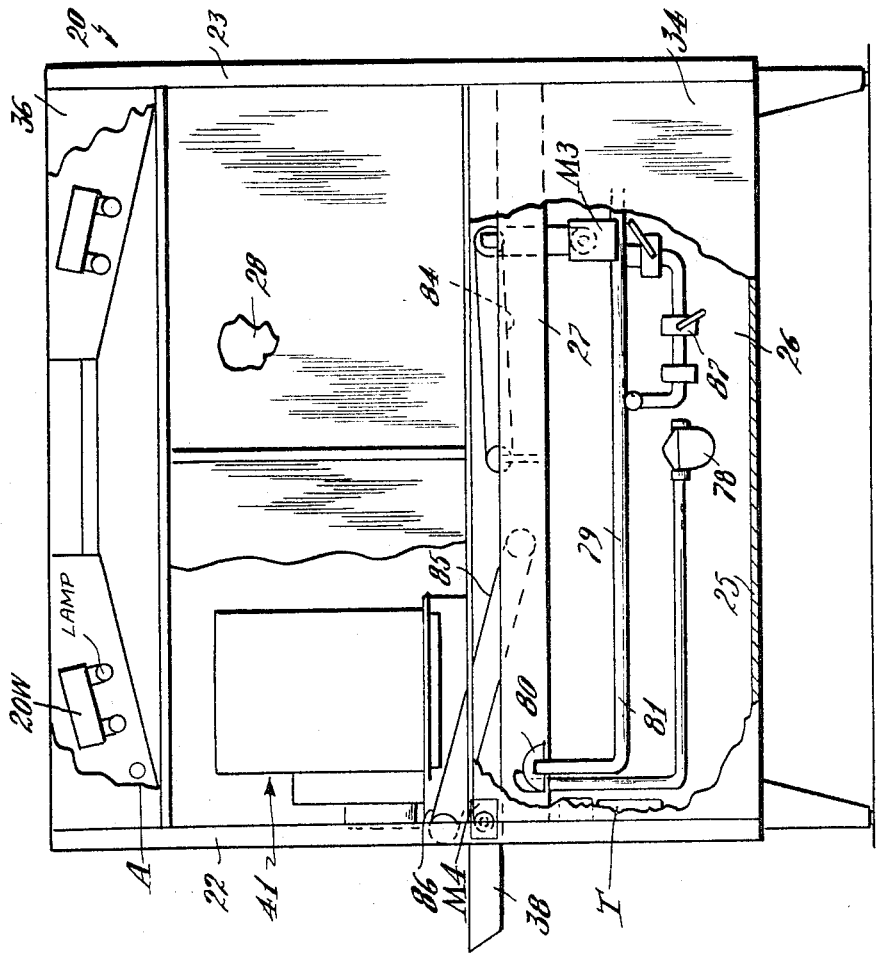
FIG. 3 is a diagrammatic side elevation of the apparatus of FIG. 1, to larger scale than FIG. 1, and with a portion of the outer casing broken away to show the interior construction, certain parts being indicated in dotted lines.
Figure 4:
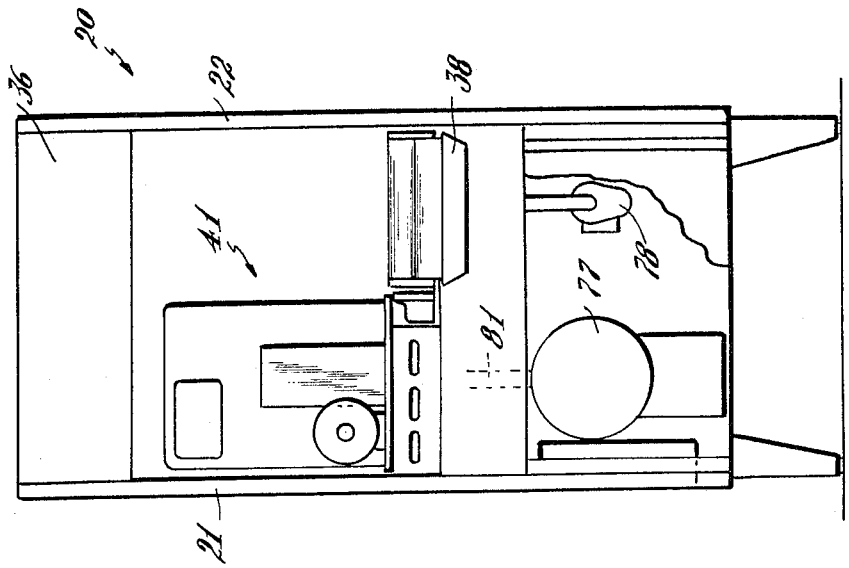
FIG. 4 is a diagrammatic front elevation showing the slicing unit and supply hopper.

Referring to the drawings, the numeral 20 (FIGS. 1, 2, 3 and 4) designates the apparatus as a whole, shown as embodied in a cabinet comprising a frame including the corner posts 21, 22, 23 and 24 having supporting legs at their lower ends and which are connected by suitably arranged longitudinally and transversely extending members, certain of which carry the floor 25 (FIG. 3) of a lower compartment 26 which houses certain of the operating mechanisms as hereinafter described. Above this lower compartment 26 the cooking pan or vat 27 (FIGS. 3, 15 and 16) is suitably supported as, for example, by transversely extending girders (not shown) and above the pan there is a chamber 28 (FIGS. 3 and 17) whose ceiling is formed by upwardly sloping and converging panels 29 (desirably of glass), whose upper edges are united to the side walls of a rectangular box providing a chamber 30 which houses a horizontal air filter 31 and an exhaust fan F and fan motor M. The opening is desirably protected by a grid beneath which a second air filter may be arranged. The rear wall and one side wall of the chamber 28 are closed by glass panels 35 (FIG. 2). The other side wall of the chamber 28 comprises one fixed glass panel 35a and a sliding glass panel 35b. The side and end walls of the lower chamber 26 are closed by solid panels 34, for example of stainless steel or other appropriate metal construction, while the side and ends of the chamber 28 (FIG. 3), whose roof is formed by the panels 29, are likewise closed by opaque panels 36, for example of stainless steel or other appropriate metal construction. At its left-hand end, as viewed in FIG. 1, the cabinet is provided with an open-topped receptacle 38 (FIGS. 1, 2, 3 and 4) designed to receive the cooked potato chips and to hold them conveniently exposed so that the attendant may remove them for dispensing to a customer.

Figure 15:
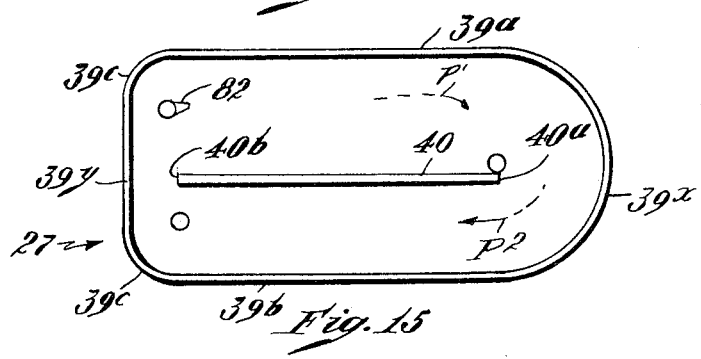
FIG. 15 is a small scale plan view of the cooking pan removed from the casing.
Figure 16:
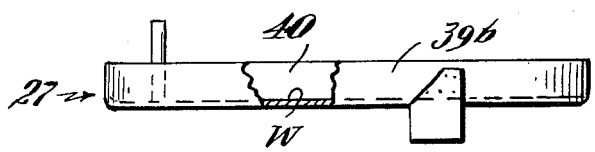
FIG. 16 is a side elevation of the cooking pan, partly broken away.
Figure 17:
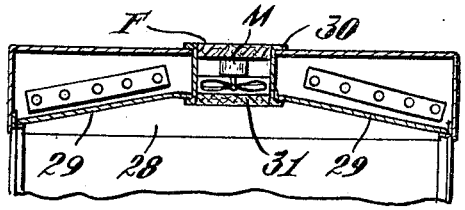
FIG. 17 is a fragmentary, longitudinal, small-scale vertical section showing the upper part, only, of the casing of the apparatus, including the exhaust fan.

As shown in FIG. 16, the cooking pan 27 has a horizontal bottom wall W and an upstanding peripheral side wall, said upstanding wall, as shown in FIG. 15, comprising substantially parallel, rectilinear side portions 39a, 39b (FIG. 15) united at one end by an arcuate portion 39x and at its opposite end by a substantially rectilinear wall 39y which is joined to the side walls 39a and 39b by arcuate portions 39c of smaller radius than the end wall 39a. Approximately midway between the parallel side walls there is arranged an upstanding divider plate 40 rigidly secured to the bottom wall W and of a vertical height approximating that of the side walls of the pan. The end 40a of this divider is located approximately at the center of curvature of the end wall 39x, while the opposite end 40b of the divider is spaced a shorter distance from the wall 39b of the pan. This divider, interposed between and substantially parallel to the side walls 39a and 39b of the pan, so cooperates with the side walls as to define a path, as indicated by the broken arrows P¹ and P², along which the cooking fluid may circulate.

Figure 1:
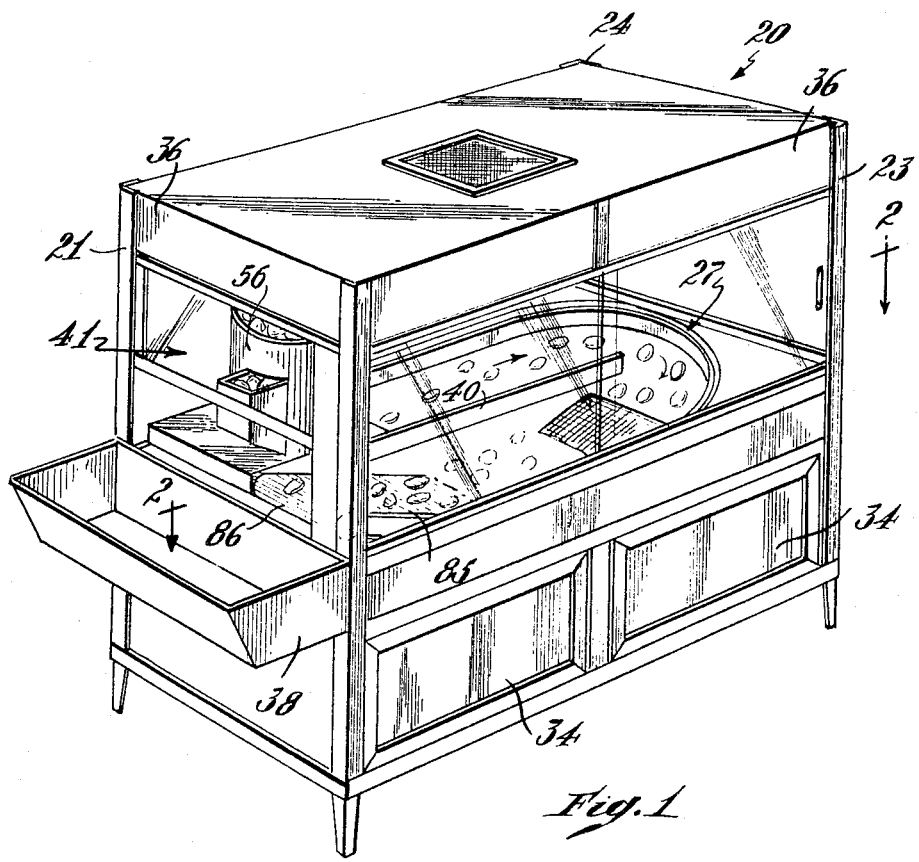
FIG. 1 is a perspective view (to some extent diagrammatic in character) showing the complete apparatus as it appears when installed in readiness for use.
Figure 7:
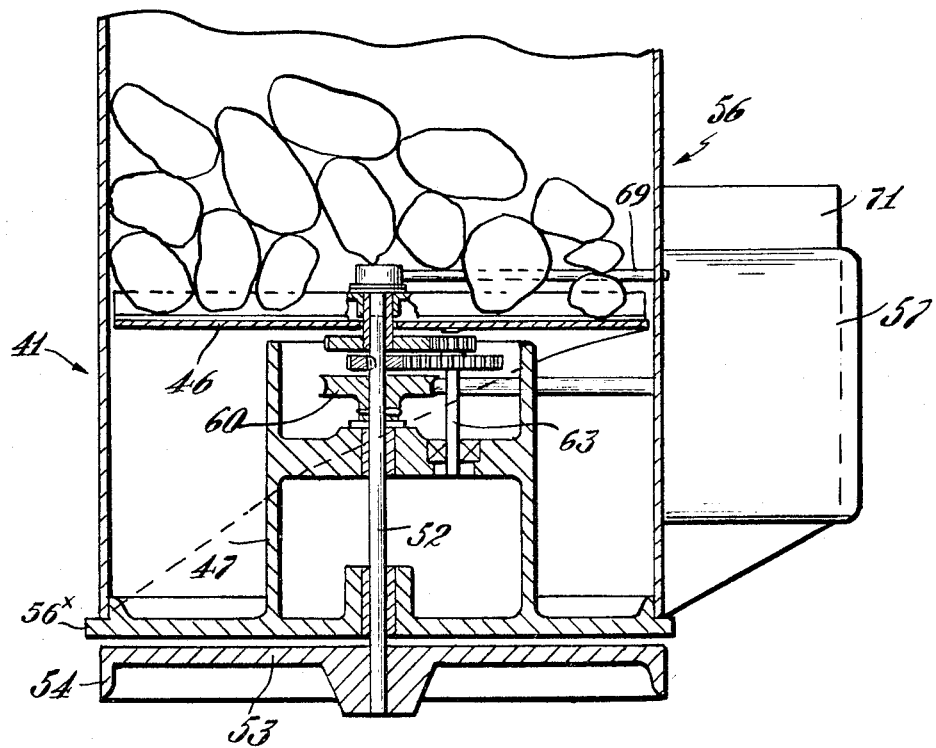
FIG. 7 is a more-or-less diagrammatic vertical section, partly in elevation, and to somewhat larger scale than FIG. 6, showing the supply reservoir and the shaft which actuates the agitating element in the supply reservoir and also the disc which carries the slicing instrumentalities.
Figure 8:
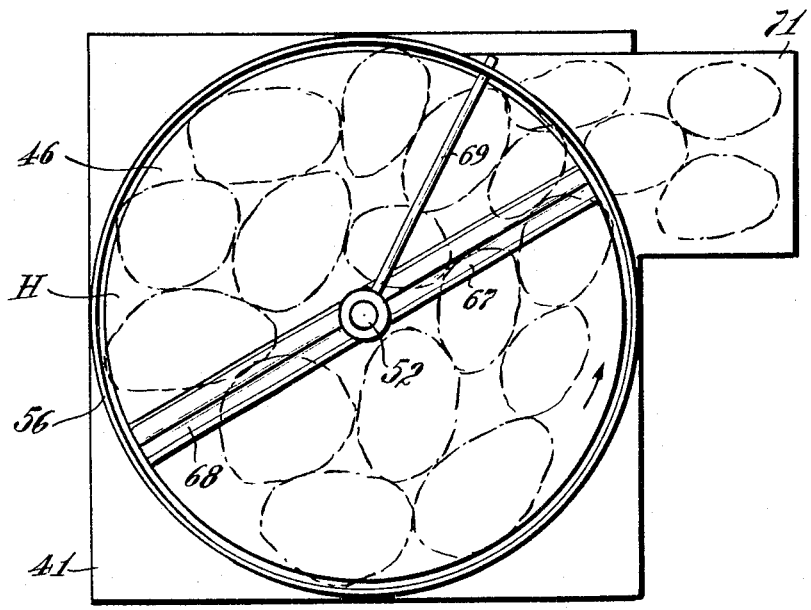
FIGS. 8 and 9 are diagrammatic horizontal sections, the first in a plane immediately above the floor of the supply reservoir and the second substantially in the plane of the line 8—8 of FIG. 6.
Figure 14:
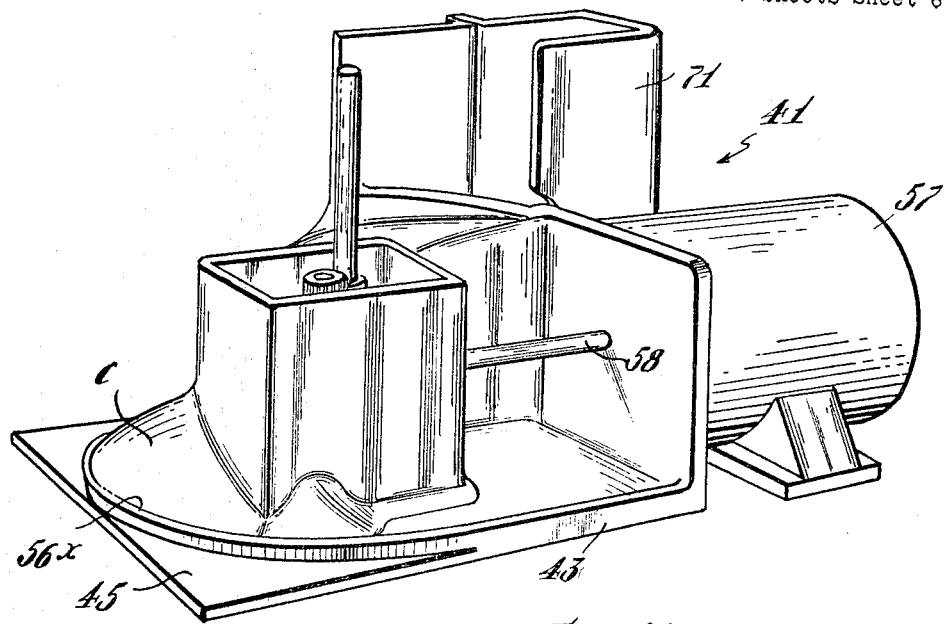
FIG. 14 is a perspective view of the unitary casting which provides the chamber for the gearing and the passage of progressively diminishing transverse area through which the potatoes pass in approaching the field of action of the slicing blades, and by means of which the potatoes are wedged into contact with the upper face of the rotating blade-carrying disc.
Figure 13:
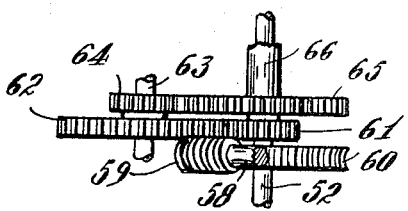
FIG. 13 is a fragmentary elevation showing the gearing for driving the slicing blades and the agitating devices in the hopper.
Figure 10:
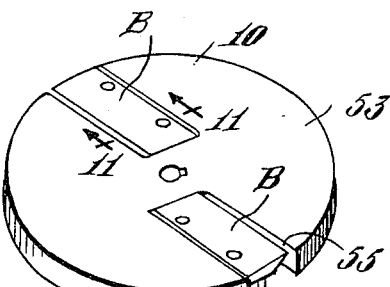
FIG. 10 is a perspective view showing the disc which carries the slicing knives.

Above the left-hand end of the pan, as viewed in FIG. 1, there is supported the slicing unit 41, which base extends from the upper edge of the divider plate 40 to the side wall 39a of the pan 27. Associated with the slicing unit is a hopper or storage receptacle 56 for the raw peeled potatoes. The slicing unit 41 comprises a unitary hollow casting C (FIG. 14) having a base 45, and supports a horizontal plate 46 (FIGS. 6, 7 and 8) having a substantially flat and smooth upper surface constituting the floor of the hopper 56. Vertical, integral walls 47 (FIG. 6), together with a horizontal web 48, define an interior chamber 49 for the reception of gearing, hereinafter described. This casting is provided with aligned bearings 50, 51 (FIG. 6) carried by the base member and web 48 respectively, for a vertical shaft 52 (FIGS. 6 and 13) which extends down to a point below the base 45 and has fixed to its lower end a disc member 53 (FIG. 10) having a downwardly directed peripheral flange 54 (FIGS. 6 and 10) and radial slots 55, in each of which is arranged the chisel-edge of blade B, the chisel-edge being located a short distance above the upper surface of the disc. These blades are so connected to the disc that they may be adjusted to project up from the surface of the disc, for example, by placing one or more shims beneath them thereby to vary the thickness of the slice being produced. The lower portion of the cylindrical magazine or hopper 56 embraces the slicing unit 41 with its lower edge seated against a peripheral flange 56x (FIG. 6) forming a part of the base of the slicing unit 41.

Figure 9:
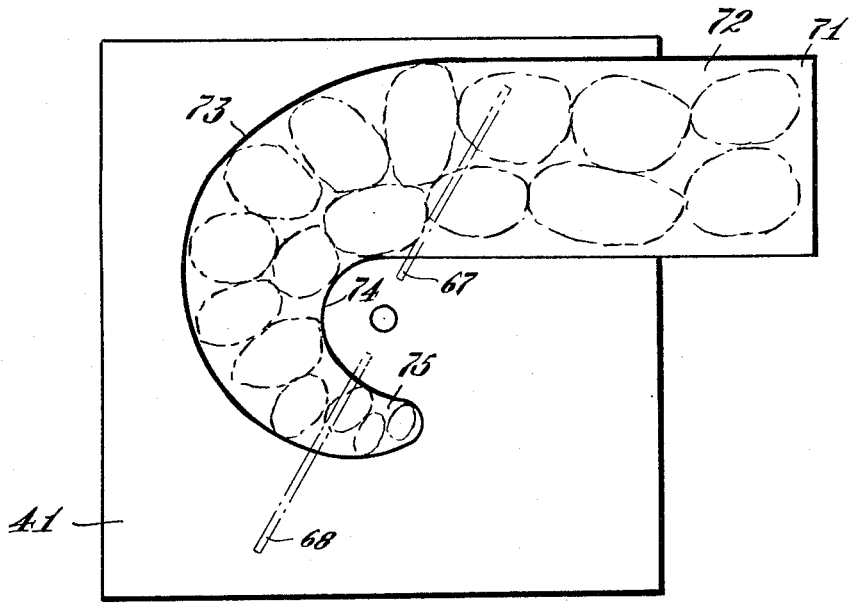
Figure 12:
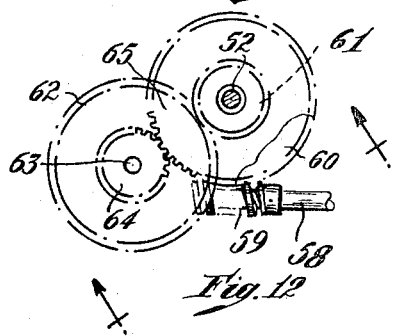
FIG. 12 is a fragmentary plan view of the reduction gearing for driving the slicing blades and the agitating vanes.
Figure 11:
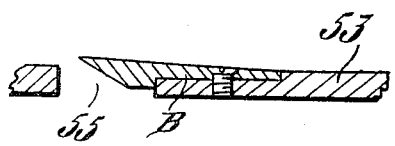
FIG. 11 is a fragmentary section, to larger scale, on the line 11—11 of FIG. 10.

A motor casing 57 is fixedly secured to the casting of the slicing unit, and the shaft 58 (FIGS. 5, 12, 13 and 14) of this motor extends inwardly through a suitable opening in the wall 47 of the casting and is provided at its inner end with a worm 59 (FIGS. 12 and 13) which meshes with a worm wheel 60 fixed to the shaft 52. By this means the shaft 52, together with the disc 53 and slicing blades B are driven at a speed substantially less than that of the motor shaft. A spur gear 61 (FIGS. 12 and 13), coaxial with and fixed to the worm wheel 60, turns with the shaft 52. This gear 61 meshes with a larger spur gear 62 which turns freely on a stationary stud shaft 63 supported by the casting. Fixed to and coaxial with the gear 62 there is a spur gear 64 of smaller diameter than the gear 62 which turns freely on shaft 63 and meshes with a spur gear 65 of larger diameter which is free to turn on the shaft 52. A sleeve 66, free to turn on the shaft 52, is coaxial with and fixed to the gear 65, the gearing thus provided being such as to turn the sleeve 66 at an angular velocity substantially less than that of the shaft 52 but in the same direction. To this sleeve 66 there are secured two oppositely extending vanes 67 and 68 (FIG. 5) respectively, these vanes as here shown being radial with respect to the shaft 52 and being arranged just above the upper surface of the plate 46, the latter, as above noted, constituting the floor of the potato magazine or hopper 56. These vanes, as shown, for example, in FIG. 6, are of substantially inverted V-shape in transverse section and as they rotate they agitate the potatoes within the hopper without crushing them, causing the potatoes to rise and fall while moving slowly around the hopper until eventually they come into contact with a fixed barrier bar 69. This bar has a hub portion 69a (FIG. 6) within which the shaft 52 turns freely, the bar being so long that it contacts a part of the wall of the hopper which thus prevents it from rotating. The diminishing triangle formed by the rotating raised vane 68 (FIG. 6) and the fixed barrier bar 69 (FIG. 6) forces the potatoes individually through the opening 70 (FIG. 6) in the wall of the hopper. As they drop, they enter the upper end of a chute 71 fixed to the casting C which leads them into the upper end of a passage 72 (FIG. 9) formed within the casting C. This passage 72 has a smooth inner surface with side walls 73 and 74 (FIG. 9) of helical contour, so arranged that they gradually converge until at its end 75 the passage is very narrow. The helical walls are so arranged that the curved and narrowing passage leads the potatoes in the direction of rotation of the disc 53. At the same time, the upper wall 76 of the passage becomes lower-and-lower, progressively, until at the end 75 the height of the passage is substantially zero. This passage 72 in the casting C is open at its bottom and its floor is actually formed by the upper surface of the disc 53. Thus as the potatoes move along this passage, the frictional action of the rotating disc tends to impel them toward the smaller end of the passage with the result that they are progressively wedged more-and-more firmly against the upper surface of the disc so that when they can no longer move forwardly in the passage, the upwardly projecting blades remove slice-after-slice from the undersurface of the potato until the potato is entirely consumed. In order to increase the feeding action of the blade-carrying disc thereby to urge the potato toward the narrower end of the passage, the upper surface of the disc may be so shaped as to provide at least some positive impelling action as well as frictional drag, for example by forming the upper surface of the disc with two helices, each originating at one blade and terminating at the other. As the slices of potato are cut off, they drop down through the slots 55 in the disc and directly into the cooking pan 27 at a point between the divider 40 and side wall 39a adjacent to the end wall 39a. Within the cooking pan a body of cooking fluid, for example oil or grease, is maintained at a uniform level and at a predetermined temperature. For this purpose there is arranged, within the lower compartment 26 of the apparatus, a heat exchanger 77 (FIG. 4) of conventional type provided with heating means (electrical or gas) and through which the cooking fluid is circulated by means of an electrically-actuated pump 78. This pump receives cooking fluid from the pan through a sump pipe 79 which takes fluid from the pan through a strainer-filter 80. The pump forces the fluid through the heat exchanger 77 and through a pipe 81 (FIG. 4) to a jet nozzle 82 (FIG. 15) arranged within the pan 27 at a point near the end 39y of the pan and between the divider 40 and the wall 39a of the pan, the nozzle being so directed that as the fluid enters the pan, it tends to induce a flow of the fluid in the pan as indicated by the dotted arrows P¹ and P² (FIG. 15) as above described.

Within that part of the pan (FIG. 3) which lies between the divider 40 and the wall 39b, there is arranged a motor-driven endless conveyor having a downwardly moving lower run 84 (FIG. 3) which inclines downwardly, extending from a point above the level of the fluid in the pan to a point below the surface of the fluid, this conveyor being so arranged that potato slices, floating in the fluid as the latter circulates within the pan, are caught by the downgoing run 84 of the conveyor and thus submerged within the fluid. At a point beyond the conveyor just described, in the direction of fluid flow, there is a second conveyor having an upwardly inclined, upwardly moving run 85 whose lower end is beneath the level of the liquid in the pan and whose delivery end portion 86 is above the level of the liquid and located at a point outside of the casing of the apparatus, as shown at 86 (FIG. 1), such that cooked potato chips carried upwardly by the coveyor run 85 drop from the latter at the point 86 into the open top of the receptacle 38.

Provision is made, as by a valve 87, for draining fluid from the cooking pan when it is desired to clean the pan, and a thermostat A (FIGS. 3 and 18) controls the operation of the heat exchanger 77. The conveyors 84 and 85 which act, respectively, to submerge and to elevate the potato chips are driven by independent gear-head motors $M^3$ and $M^4$ respectively and the motor $M^1$ within the casing 57 which drives the shaft 52 is controlled by timing mechanism T' (FIG. 3) which may be set to stop the motor after it has run for a predetermined period of time, the motor being started by an attendant by the actuation of a suitable switch, for example a push button switch. Thus the output is automatically controlled, assuring a uniform product and overproduction of raw slices is prevented. Since the submerging and elevating conveyors are driven by independent gear-head motors, it is possible to subject the potato slices to just the proper cooking time to insure a quality product. In FIG. 18 the part marked $M^2$ is the pump motor and the part marked T is a time clock which determines the length of the period within which the heat exchanger will operate.

FIGURE 18 further shows conventional fluorescent lamps $20^w$ and the part marked "Ballast" which is the customary circuit control for such lamps as such devices are conventionally designated.

By the provision of the exhaust fan F in the upper part of the casing and the filters through which the air which is withdrawn from the casing must pass, cooking odors are effectively removed, the casing of the machine is kept at a safe temperature, and condensation upon the inner surfaces of the glass panels is prevented. The electrical circuit is so devised that it is not possible to start the heat exchanger into action until the circulating pump has been started. The strainer at the inlet to the sump pipe 79 prevents large solid particles from entering the circulating system such as might tend to clog or reduce the flow. By the use of a fluid jet for circulating the cooking oil, it is unnecessary to use mechanical impelling means such as have a tendency to break up the chips, and the potato slices are moved gently along by the flowing liquid. The formation of eddies or cross-currents is minimized by the divider 47 and by the large radius at the end 39x of the cooking pan and by the rounded corners 39c adjacent to the end 39y. Thus the intermixture of slices at different stages of the cooking operation is prevented.

By means of the improvements as above described, it is made possible, by the use of apparatus of a size convenient for installation in establishments where space is limited, and which may readily be serviced by a single attendant of but moderate skill, to make and to deliver potato chips in retail quantities, and in a period of time such that they may be made ready on order and dispensed to a waiting customer, and without discharging unpleasant fumes and making an unpleasant noise.

Because all parts which contact the potatoes or potato slices are readily asccessible and may be removed for cleaning the apparatus, it is a practical matter to clean and sterilize the parts as a preliminary to each day's operation, thus complying with the most stringent sanitary regulations and insuring a product which is not contaminated by unpleasant flavors or odors.

It will be understood that the apparatus as herein illustrated and described is merely by way of example of means whereby the objects of the invention may be attained and that the invention is inclusive of any and all modifications and equivalents and combinations thereof which fall within the scope of the appended claims.

We claim:

1. Apparatus for preparing potato chips comprising, in combination, a slicing blade carried by a rotating disc having a substantially flat horizontal upper surface, the disc having therein a substantially radial slot above which the cutting edge of the blade is positioned and through which a slice of potato may drop, a reservoir for peeled raw potatoes located above the plane of revolution of the blade, and means defining a passage leading to the field of action of the blade, means for delivering potatoes from the reservoir into the entrance end of the passage, said passage having side walls and a roof, the side walls being helically curved and so arranged that the side walls of the passage progressively decrease in width in the direction of rotation of the disc while the roof of the passage progressively approaches the surface of the disc, the surface of the disc constituting a floor for the passage whereby the frictional drag exerted by the disc tends to crowd a single potato into the narrow end of the passage and thereby urge it downwardly and hold it firmly in contact with the disc and in the path of the revolving blade, further characterized in that the reservoir has a substantially flat horizontal floor and a delivery aperture at one side, at least one revolving vane within the reservoir operative to agitate the potatoes in the reservoir while urging them toward the aperture, barrier means operative so to retard potatoes moving toward said aperture as to prevent potatoes from jamming at the entrance to said aperture, and means for guiding a potato, escaping from the reservoir, to the entrance to said convergent passage.

2. Apparatus according to claim 1, further characterized in having a rigid stationary casting having therein a vertical bearing bore, and a power-driven shaft rotatable therein to which the blade-carrying disc is secured, said casting constituting the means which defines the passage, the passage having fixed side walls and a roof and being open at its lower end, the side walls and roof being of such shape that, as a potato moves along the passage toward the field of action of the blade, the potato is progressively confined within a smaller-and-smaller space.

3. Apparatus according to claim 1, further characterized in that the casting supports a horizontal plate having a smooth upper surface constituting the floor of the reservoir, and the means within the reservoir which is operative constantly to agitate the potatoes comprises two rigid vanes revolving about the vertical axis of the blade-carrying disc and which urge the potatoes toward said discharge aperture.

4. Apparatus according to claim 3, further characterized in that the means for agitating the potatoes in the reservoir comprises two diametrically opposed vanes, each radial relatively to the axis of the shaft which drives the blade-carrying disc, each of said vanes being of inverted, substantially V-shape in transverse section, while the barrier is a fixed rigid bar so located relatively to the floor of the reservoir and to the delivery aperture that individual potatoes, urged forwardly by the revolving vanes, ride up and over the bar and drop into the upper end of the converging passage.

5. Apparatus according to claim 1, further characterized in that the side walls of the passage along which the potatoes advance in approaching the field of action of the slicing blade are helical and gradually approach one another so that the passage becomes progressively narrower while partially encircling the axis about which the blade revolves.

6. Apparatus according to claim 2, further characterized in having means so supporting the unitary stationary casting, which is shaped to define the side walls and roof of the passage along which the potatoes travel in approaching the field of action of the blade, that the base of the casting is directly above the plane of rotation of the blade.

7. Apparatus according to claim 2, further characterized in that said casting has therein a chamber constituting a gear housing, the shaft to which the blade-carrying disc is secured extending into said chamber, a worm wheel on said shaft, a worm engaging said worm wheel, and an electrical motor for driving the shaft on which the worm is mounted.

8. Apparatus according to claim 1, further characterized in having power-actuating means for operating the agitating and slicing means, and means operative automatically to terminate operation of the agitating and slicing means at the end of a predetermined period.

References Cited by the Examiner

UNITED STATES PATENTS

| | | | |
|---|---|---|---|
| 311,670 | 2/1885 | Northrup | 222—235 X |
| 539,362 | 5/1895 | Head et al. | 222—236 |
| 1,043,673 | 11/1912 | Covington | 222—236 |
| 1,086,248 | 2/1914 | Varian | 99—406 |
| 1,629,355 | 5/1927 | Morrow | 99—353 |
| 1,690,104 | 11/1928 | Denz | 99—406 |
| 2,077,395 | 4/1937 | Chapel | 99—406 X |
| 2,462,105 | 2/1949 | Kobey | 146—124 |
| 2,519,985 | 8/1950 | Thompson | 146—165 |
| 2,558,892 | 7/1951 | Wise | 99—406 |
| 2,813,161 | 11/1957 | Tuttle. | |
| 2,861,514 | 11/1958 | Sech | 99—406 |
| 2,917,093 | 12/1959 | Henry | 146—165 |

CHARLES A. WILLMUTH, *Primary Examiner.*

LAWRENCE CHARLES, *Examiner.*

W. A. VANSANTEN, S. E. BECK,
*Assistant Examiners.*